US012668994B2

(12) United States Patent
Wistrand et al.

(10) Patent No.: US 12,668,994 B2
(45) Date of Patent: Jun. 30, 2026

(54) PADLOCK BODY FOR ENGAGING WITH A REPLACEABLE LOCKING CYLINDER

(71) Applicant: ANCHOR LÅS AB, Eskilstuna (SE)

(72) Inventors: Joel Wistrand, Eskilstuna (SE); Tomas Eriksson, Kvicksund (SE)

(73) Assignee: ANCHOR LÅS AB, Eskilstuna (SE)

( * ) Notice: Subject to any disclaimer, the term of this patent is extended or adjusted under 35 U.S.C. 154(b) by 8 days.

(21) Appl. No.: 18/859,340

(22) PCT Filed: Jun. 2, 2023

(86) PCT No.: PCT/SE2023/050550
§ 371 (c)(1),
(2) Date: Oct. 23, 2024

(87) PCT Pub. No.: WO2023/244151
PCT Pub. Date: Dec. 21, 2023

(65) Prior Publication Data

US 2025/0263949 A1 Aug. 21, 2025

(30) Foreign Application Priority Data

Jun. 16, 2022 (SE) .................................... 2250726-3

(51) Int. Cl.
*E05B 9/08* (2006.01)
*E05B 17/20* (2006.01)
(Continued)

(52) U.S. Cl.
CPC .......... *E05B 9/084* (2013.01); *E05B 17/2084* (2013.01); *E05B 67/08* (2013.01); *E05B 67/24* (2013.01); *E05B 2017/2096* (2013.01)

(58) Field of Classification Search
CPC ...... E05B 9/084; E05B 17/2084; E05B 67/08; E05B 67/24; E05B 67/22; E05B 67/00;
(Continued)

(56) References Cited

U.S. PATENT DOCUMENTS 4,158,952 A * 6/1979 Oliver ...................... E05B 67/24
70/52
4,776,187 A * 10/1988 Evans ..................... E05B 67/24
70/52

(Continued)

FOREIGN PATENT DOCUMENTS

CN 2041340 U 7/1989
CN 201068678 Y * 6/2008 ......... E05B 37/0034

(Continued)

OTHER PUBLICATIONS

International Search Report and Written Opinion for Patent Cooperation Treaty Application No. PCT/SE2023/050550, dated Oct. 7, 2023, 77 pages.

(Continued)

*Primary Examiner* — Steven A Tullia
(74) *Attorney, Agent, or Firm* — Alston & Bird LLP

(57) ABSTRACT

The invention relates to a padlock body (10) for engaging with a replaceable locking cylinder (20) comprising: an actuator (30) comprising a groove (32), the actuator (30) being rotatable about a vertical axis (X) between a locked position and an unlocked position; the actuator (30) further comprising a first end and a second end opposed to the first end, the first end comprising the groove (32) and the second end being operatively connectable to the replaceable locking cylinder (20); a shackle (12) comprising a first end (13) and a second end (14), the first end (13) being attached to said padlock body (10), the second end (14) being movable for engaging with the groove (32) of the actuator (30); and at least one fastener (40) for securing the padlock body (10) to the replaceable locking cylinder (20).

14 Claims, 5 Drawing Sheets

(51) Int. Cl.
*E05B 67/08* (2006.01)
*E05B 67/24* (2006.01)

(58) Field of Classification Search
CPC .......... E05B 67/02; E05B 67/04; E05B 67/06; E05B 67/063; E05B 2017/2096; E05B 37/0034; E05B 37/025; E05B 35/105; Y10T 70/7661
USPC ............................ 70/370, 35, 20, 33, 52, 53
See application file for complete search history.

(56) References Cited

U.S. PATENT DOCUMENTS

| | | | | |
|---|---|---|---|---|
| 6,393,876 | B1 * | 5/2002 | Matyko | E05B 67/02 70/52 |
| 6,860,125 | B1 * | 3/2005 | Yu | E05B 67/10 70/25 |
| 7,021,092 | B2 * | 4/2006 | Loughlin | E05B 63/143 70/52 |
| 7,114,356 | B1 * | 10/2006 | Yu | E05B 37/0034 70/21 |
| 7,140,209 | B2 | 11/2006 | Lai | |
| 7,204,108 | B2 * | 4/2007 | Yu | E05B 39/00 70/330 |
| 7,225,648 | B2 * | 6/2007 | Lai | E05B 67/10 70/21 |
| 7,370,497 | B2 * | 5/2008 | Yu | E05B 35/105 70/284 |
| 7,424,812 | B2 * | 9/2008 | Loughlin | E05B 35/105 70/56 |
| 7,493,785 | B2 * | 2/2009 | Yu | E05B 37/025 70/284 |
| 7,520,150 | B2 * | 4/2009 | Yu | A45C 13/10 70/435 |
| 7,628,045 | B2 * | 12/2009 | Yu | E05B 67/10 70/284 |
| 7,770,421 | B2 * | 8/2010 | Yu | E05B 37/025 70/432 |
| 8,056,376 | B2 * | 11/2011 | Yu | E05B 67/10 70/284 |
| 8,096,151 | B2 * | 1/2012 | Cheevers | E05B 67/24 70/38 A |
| 8,234,896 | B2 * | 8/2012 | Uliano | E05B 67/24 70/38 A |
| 8,256,250 | B2 * | 9/2012 | Yu | E05B 39/00 70/284 |
| 8,353,184 | B2 * | 1/2013 | Ling | E05B 39/00 70/284 |
| 8,505,343 | B2 * | 8/2013 | Yu | E05B 37/0034 70/284 |
| 8,621,899 | B2 * | 1/2014 | Kuo | E05B 37/025 70/284 |
| 8,776,557 | B2 * | 7/2014 | Wang | E05B 67/36 70/371 |
| 8,904,833 | B1 * | 12/2014 | Liu | E05B 9/084 70/38 C |
| 8,978,426 | B2 * | 3/2015 | Wang | E05B 67/36 70/371 |
| 9,228,373 | B2 * | 1/2016 | Huang | E05B 37/025 |
| 2004/0226323 | A1 | 11/2004 | Ling et al. | |
| 2005/0034492 | A1 | 2/2005 | Yu | |
| 2005/0132762 | A1 | 6/2005 | Yu | |
| 2008/0060390 | A1 * | 3/2008 | Yu | E05B 35/105 70/21 |
| 2008/0156046 | A1 * | 7/2008 | Yu | E05B 39/00 70/21 |
| 2008/0307834 | A1 | 12/2008 | Ma | |
| 2010/0242551 | A1 * | 9/2010 | Yu | E05B 39/00 70/41 |
| 2013/0276486 | A1 | 10/2013 | Yu | |
| 2014/0047873 | A1 | 2/2014 | Yu | |
| 2023/0366242 | A1 | 11/2023 | Fan | |

FOREIGN PATENT DOCUMENTS

| | | | | | |
|---|---|---|---|---|---|
| DK | 2868850 | T3 | | 7/2018 | |
| GB | 2427244 | A | * | 12/2006 | E05B 67/18 |
| JP | 2006022641 | A | * | 1/2006 | E05B 67/18 |
| SE | 516217 | C2 | * | 12/2001 | E05B 9/04 |
| TW | M240471 | U | * | 8/2004 | E05B 37/025 |
| TW | M247655 | U | * | 10/2004 | E05B 25/105 |
| TW | 1322216 | B | * | 3/2010 | E05B 37/0034 |
| WO | WO-2006015552 | A1 | * | 2/2006 | E05B 37/025 |
| WO | WO-2021024355 | A1 | * | 2/2021 | E05B 67/22 |
| WO | WO-2021066720 | A1 | * | 4/2021 | E05B 67/38 |
| WO | WO 2022/073854 | A1 | | 4/2022 | |

OTHER PUBLICATIONS

Swedish Search Report for Application No. 2250726-3, dated Jan. 27, 2023, 2 pages.

* cited by examiner

PADLOCK BODY FOR ENGAGING WITH A REPLACEABLE LOCKING CYLINDER

CROSS-REFERENCE TO RELATED APPLICATIONS

This application is a National Stage Application, filed under 35 U.S.C. § 371, of International Application No. PCT/SE2023/050550, filed Jun. 2, 2023, which international application claims priority to and the benefit of Swedish Application No. 2250726-3, filed Jun. 16, 2022; the contents of both of which as are hereby incorporated by reference in their entireties.

TECHNICAL FIELD

The present invention relates generally to a padlock body for engaging with a replaceable locking cylinder, a padlock comprising a padlock body and a replaceable locking cylinder, and methods thereof.

BACKGROUND ART

A padlock is a detachable locking device comprising three basic components: a padlock body, a shackle and a locking mechanism. The padlock body comprises an internal cavity holding the locking mechanism. The shackle works with what is being secured, locked, by the padlock (e.g., chain link or hasp) and is usually elongated and has two ends. The shackle can be straight but usually the shackle is looped, on a somewhat U-shaped. A first end of the shackle is attached to the padlock body in a pivotal and/or rotatable manner and a second end, when the padlock is to be secured and locked in a working position, is to be pivoted/rotated and placed into an opening in the padlock body to get into a position where the locking mechanism is working on the second end of the shackle and by that locking the padlock.

A typical padlock comprises a padlock body having a shackle and a locking cylinder. The locking cylinder comprises a locking mechanism such as a plug having a cam at one end, chambers having springs and pins, and latches. When they key is inserted into the plug, the pins are moved such that the key can rotate the plug. Further, the rotation of the plug rotates a cam, which pulls the latches and releases the shackle. Some padlocks are both key-operated and combination-operated for allowing a backup solution in case the key or the combination is lost.

A problem with such padlocks is that they are costly to manufacture, and complex to substitute the locking mechanism and/or locking cylinder from the padlock body, since it must be fixed by a skilled locksmith. It may be more effective to substitute the whole padlock, which also increases the costs, the environmental impact, and requires that the padlock is unlocked. Moreover, said padlocks can have security issues, since the screw or pin that fixes the locking cylinder to the padlock body is in sight and may be easily accessed or removed, even when the padlock is in a locked position.

SUMMARY OF INVENTION

An object of the present disclosure is thus to overcome or at least mitigate one or more of the problems described herein. Another object of the present disclosure is to provide a low-cost padlock body that is easy to manufacture and that has an attached or attachable locking cylinder that is simple to substitute. Another object of the present disclosure is to provide a secure padlock body that avoids or reduces picking, jamming and other security breaches, such as the removal of one or more elements, such as screws, from the padlock or padlock body.

Other features and advantages of the invention will be apparent from the following detailed description, drawings and from the claims.

One or more objects of the disclosure are solved by providing a padlock body for engaging with a replaceable locking cylinder comprising:

- an actuator comprising a groove, the actuator being rotatable about a vertical axis between a locked position and an unlocked position; the actuator further comprising a first end and a second end opposed to the first end, the first end comprising the groove and the second end being operatively connectable to the replaceable locking cylinder;
- a shackle comprising a first end and a second end, the first end being attached to said padlock body, the second end being movable for engaging with the groove of the actuator; and
- at least one fastener for securing the padlock body to the replaceable locking cylinder;

wherein

- in the unlocked position, the actuator is rotated about the vertical axis X such that the groove of the actuator is positioned for engaging with the second end of the shackle;
- in the locked position, the actuator is rotated about the vertical axis X such that, when the second end of the shackle is engaged with the groove of the actuator, the second end of the shackle is restrained within the groove of the actuator.

The padlock body is advantageously simple to manufacture and is compatible with a number of different replaceable locking cylinders, such as replaceable locking cylinders having different shapes and/or from different manufacturers. A non-working or outdated locking cylinder may be easily substituted by removing the fastener that engages the replaceable locking cylinder to the padlock body. Furthermore, the padlock body may not need to comprise moving components such as springs and latches, which simplifies manufacturing and reduces costs. Finally, said padlock body is cheaper to manufacture due to its relatively simpler operation mechanism and it may be commercialized without a replaceable locking cylinder (thus as a standalone product) compatible with replaceable locking cylinders, which further reduces costs and increases flexibility.

Another advantage that reduces the cost of the padlock body is that the padlock body is arranged to allow the second end of the shackle to reach the actuator when the second end of the shackle is merely rotated towards the actuator. In other words, the locked/unlocked positions may be reached by merely radially moving the second end of the shackle to/out of the groove of the actuator and rotating an actuating device (e.g. key) to the respective locked/unlocked position. Thus, the padlock body may be locked or unlocked without the need of mechanisms (e.g., springs) that axially move the shackle into or out of the actuator. Thus, the padlock body is simpler and cheaper to manufacture.

According to one exemplary embodiment, the padlock body comprises a first opening adapted for attaching and allowing a free rotation of the first end of the shackle. The shackle may be attached to the first opening of the padlock body by any means known by the skilled person and which hinders the axial movement of the shackle in relation to the padlock body, for instance as described elsewhere herein.

According to another exemplary embodiment, the padlock body comprises a second opening opposed to the first opening, the second opening adapted for receiving the replaceable locking cylinder. Said second opening may be located on the opposite side (i.e., remote from) of the first opening and advantageously allows the reception of commercial and standardized locking cylinders to the padlock body.

According to another exemplary embodiment, the padlock body comprises a third opening arranged for receiving the actuator. Said third opening is arranged to allow the actuator to receive the second end of the shackle when said second end of the shackle is moved towards the actuator. The actuator may be at least partly or fully contained within the third opening, so that in the locked state, the second end of the shackle is restrained between the groove of the actuator and the padlock body. Advantageously, the actuator is less exposed to the outside environment and less prone to picking.

According to one exemplary embodiment, the padlock body comprises the first, the second and/or the third opening as discussed above.

According to one exemplary embodiment, the padlock body further comprises an indentation, said indentation being aligned with the groove of the actuator in the unlocked position. One effect of the indentation being aligned with the groove of the actuator when said padlock body is in the unlocked position is that the indentation may guide positioning the second end of the shackle for engaging with the groove of the actuator, particularly when the actuator is at least partly inside the padlock body. The size of the indentation is equivalent to the size of the second end of the shackle and/or the size of the groove of the actuator to allow free movement of the second end of the shackle into and out of the groove. Furthermore, the padlock body may comprise two indentations such as to receive the second end of the shackle that rotates clockwise and counterclockwise.

According to another exemplary embodiment, the first end of the shackle rotates about a vertical axis which is parallel to the vertical axis X of the actuator. The first end of the shackle rotates and thus pivots the second end of the shackle for engaging with the groove of the actuator. The first end of the shackle may rotate clockwise and/or counterclockwise.

According to another exemplary embodiment, the second end of the shackle comprises a depression adapted to interlock with the groove of the actuator. One effect thereof is that the second end of the shackle is tightly fit into the groove of the actuator, thus axially and radially locking the second end of the shackle when the padlock body is in the locked position. The second end of the shackle that engages with the groove of the actuator (i.e., depression) may have a smaller diameter than the rest of the shackle, such that the smaller diameter region of the second end of the shackle matches with the size of the groove of the actuator, providing a tight grip that does not allow a radial and axial movement of the shackle, in the locked position. Furthermore, the axial movement of the second end of the shackle is hindered when said second end of the shackle is engaged with the groove of the actuator. Thus, the axial movement of the shackle is hindered by the interlock between the second end of the shackle and the groove of the actuator, as well as by the first end of the shackle attached to the padlock body, which further increases the safety of the device.

According to one exemplary embodiment, the actuator rotates about 90degrees between the unlocked position and the locked position. Said 90 degrees rotation may be advantageous to sufficiently rotate the actuator and move the groove between the unlocked and locked positions, as disclosed elsewhere herein. Moreover, said 90 degrees rotation may be the same degree of rotation of a key during locking and unlocking the device. Alternatively, the first end of the shackle may rotate 360 degrees, 270 degrees, 180 degrees or 45 degrees.

According to another exemplary embodiment, the actuator comprises a first end and a second end opposed to the first end, the first end comprising the groove and the second end being operatively connectable to the replaceable locking mechanism, such as a locking mechanism of the replaceable locking cylinder. The actuator may thus not be an integral part of the replaceable locking cylinder, which advantageously replacing the locking cylinder without the need of exchanging the actuator, thereby saving costs and simplifying the replacement process. The skilled person knows different locking mechanisms that are compatible with the padlock body, and thus padlock body may be combined with a replaceable locking cylinder comprising different locking mechanisms. The groove of the actuator may be shaped to be slightly wider than the second end of the shackle, thereby allowing said second end of the shackle to be positioned within the groove of the actuator.

According to one exemplary embodiment, the fastener comprises at least one screw or bolt, each of the at least one screw or bolt being releasably fixed into a hole extending through part of the padlock body and part of the replaceable locking cylinder. One effect thereof is that the padlock body is tightened to the replaceable locking cylinder in an effective and stable manner. Preferably, the fastener comprises two screws or bolts, each of which being releasably fixed into a hole extending through part of the padlock body and part of the replaceable locking cylinder. The advantage of using two screws or bolts is that they provide a more stable tightening of the padlock body to the replaceable locking cylinder. The skilled person is aware that other fasteners may be used, even though screws are preferred since they are the standard fastening means in the field.

According to one exemplary embodiment, the padlock body further comprises a first blocking element and a first lateral hole for receiving the first blocking element, the first lateral hole intersecting a fastening direction of the fastener, such that removal of the fastener is hindered by the first blocking element; and

- the first end of the shackle further comprises a first recess, the first recess radially enclosing part of the first lateral hole when the shackle is disengaged with the groove of the actuator, such that
- in the unlocked position, the first recess and the first lateral hole are aligned in a same plane, thereby exposing the first blocking element inserted therein; and
- in the locked position, the first recess is moved away from the radially enclosing position, such that the first end of the shackle hinders access to the first blocking element inserted therein.

One effect thereof is that the fastener tightening the padlock body to the replaceable locking cylinder cannot be removed and is not exposed to for instance lock picking. In other words, the first blocking element is positioned to at least partially cover the at least one fastener, thereby avoiding or reducing access to the fastener by an unauthorized user. Furthermore, the first blocking element is also protected from manipulation or removal due to the at least partial cover of the first blocking element by the first end of the shackle, as disclosed elsewhere herein. Only in the unlocked position it is possible to first access and then remove the first blocking element, to then access and remove the fastener.

According to one exemplary embodiment, the first lateral hole is arranged to perpendicularly intersect the fastening direction of the fastener.

According to one exemplary embodiment, in the unlocked position, the first recess and the first lateral hole are aligned in a same horizontal plane, thereby exposing the first blocking element inserted therein.

According to another exemplary embodiment, the first blocking element is a screw or a bolt. The first blocking element is easily inserted/removed from the first lateral hole using for instance a screwdriver. Any blocking element that may be easily inserted and removed from the first lateral hole may be used.

According to one exemplary embodiment, the padlock body further comprises a second blocking element and a second lateral hole for receiving the second blocking element, the second lateral hole being substantially perpendicular to a fastening direction of the fastener; and

- the first end of the shackle further comprises a second recess, the second recess radially enclosing part of the second lateral hole, such that
- the second blocking element inserted into the second lateral hole engages with the second recess, thereby fixing the first end of the shackle to the padlock body and hindering axial movements of the first end of the shackle.

One effect thereof is that the second blocking element provides a secure way to attach the first end of the shackle to the padlock. In other words, the interaction between the second blocking element and the second recess provides a free rotational movement of the first end of the shackle (and thus the whole shackle), while blocking axial movements of the first end of the shackle (and thus the whole shackle). Further, said second blocking element may be substituted in case it becomes damaged. In the locked position, the removal of the second blocking element does not compromise the safety of the padlock body since the second end of the shackle is restrained and/or interlocked with the groove of the actuator, thus the shackle is still maintained locked in position.

According to another exemplary embodiment, the second blocking element is a pin or a rod. Any blocking element that may be easily inserted and removed from the second lateral hole may be used.

According to another exemplary embodiment, the padlock body is adapted for engaging with a standard replaceable locking cylinder, such as an oval replaceable locking cylinder. One effect thereof is that the padlock body is readily compatible with standard locking cylinders, particularly oval locking cylinders. This feature provides a simple and cost-effective padlock body that is adapted for use with standard locking cylinders on the market.

Another object of the disclosure is a padlock comprising the padlock body as defined herein and a replaceable locking cylinder. The padlock provides a cost-effective device for securing an object. Further, the whole padlock does not need to be exchanged in case of mal functioning of the replaceable locking cylinder, since the replaceable locking cylinder may be easily detached from the padlock body for attaching a new replaceable locking cylinder, thereby reducing costs and simplifying the process. The safety of the padlock may be easily updated by replacing the current locking cylinder with an improved locking cylinder.

According to one exemplary embodiment, the replaceable locking cylinder is an oval replaceable locking cylinder. The oval replaceable locking cylinder is standardized, which makes it simple and easy to attach the oval replaceable locking cylinder to the padlock body.

Another aspect of the disclosure relates to a method of replacing a replaceable locking cylinder from a padlock comprising a padlock body and a replaceable locking cylinder, the padlock body comprising:

- an actuator comprising a groove, the actuator being rotatable about a vertical axis between a locked position and an unlocked position; the actuator further comprising a first end and a second end opposed to the first end, the first end comprising the groove and the second end being operatively connectable to the replaceable locking cylinder;
- a shackle comprising a first end and a second end, the first end being attached to said padlock body, the second end being movable for engaging with the groove of the actuator; and
- at least one fastener securing the padlock body to the replaceable locking cylinder;
- a first blocking element and a first lateral hole for receiving the first blocking element, the first lateral hole intersecting a fastening direction of the fastener, such that removal of the fastener is hindered by the first blocking element; and
- the first end of the shackle further comprises a first recess, the first recess radially enclosing part of the first lateral hole when the second end of the shackle is disengaged with the groove of the actuator, said method comprising the steps of:

- positioning the padlock into an unlocked position, whereby the first recess and the first lateral hole are aligned in a same plane, thereby exposing the first blocking element inserted therein;
- removing the first blocking element from the first lateral hole, thereby exposing the fastener;
- removing the fastener attaching the padlock body to the replaceable locking cylinder; and
- replacing the replaceable locking cylinder.

Advantageously, said method provides a padlock wherein the fastener tightening the padlock body to the replaceable locking cylinder cannot be removed and is not exposed to a user to for instance lock picking. In other words, the first blocking element is positioned to at least partially cover the at least one fastener, thereby avoiding or reducing access to the at least one fastener by an unauthorized user. Furthermore, the first blocking element is also protected from manipulation or removal due to the at least partial cover of the first blocking element by the first end of the shackle. Only in the unlocked position it is possible to first access and then remove the first blocking element, and then access and remove the at least one fastener. An overall improvement in the safety of the method of replacing the replaceable locking cylinder is thus achieved.

Furthermore, the method of replacing a replaceable locking cylinder from a padlock comprising a padlock body and a replaceable locking cylinder may be performed using the padlock and/or the padlock body as defined elsewhere herein.

BRIEF DESCRIPTION OF DRAWINGS

The invention is now described, by way of example, with reference to the accompanying drawings, in which.

Description of embodiments

In the following, a detailed description of the padlock body 10 and the padlock 1 is disclosed.

The term "unlocked position" is to be understood as a position where the actuator is positioned for engaging with the shackle.

The term "locked position" is to be understood as a position where the actuator is engaged with the shackle and the actuator is positioned for restraining the shackle in place.

Figure 1:
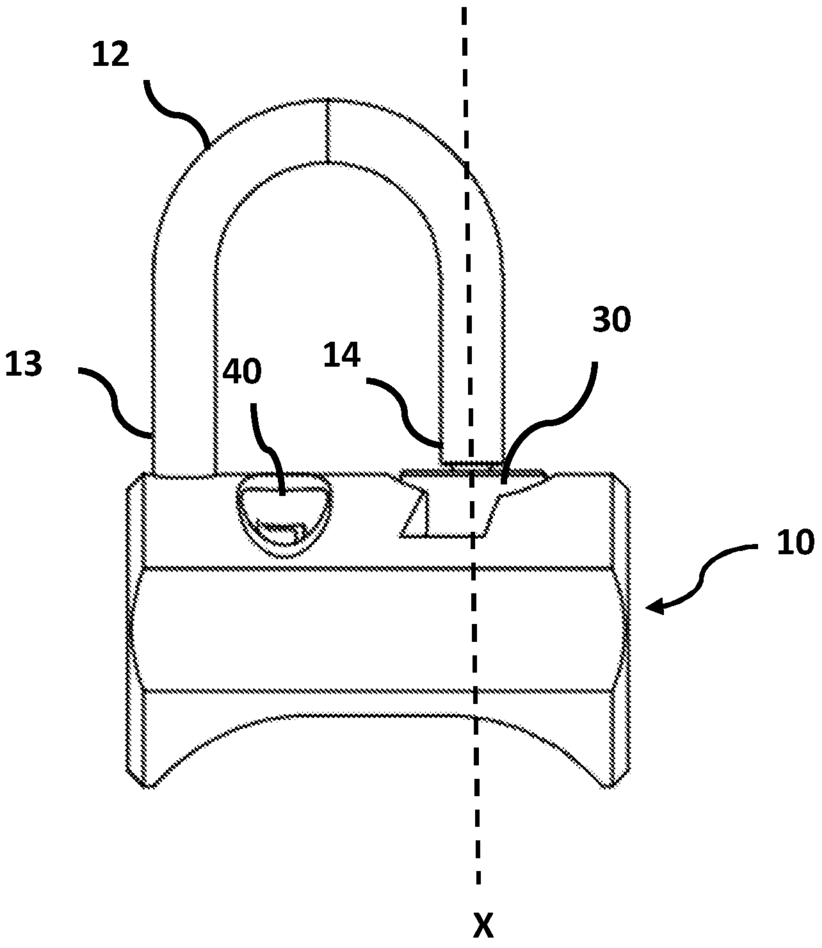
FIG. 1 illustrates a front view of the padlock body, according to an exemplary embodiment.

As shown in FIG. 1, the padlock body 10 for engaging with a replaceable locking cylinder 20 comprises a shackle 12 having a first end 13 and a second end 14. The first end 13 of the shackle 12 is pivotally attached to a first opening of the padlock body 10, while the second end 14 freely rotates about the first end 13 of the shackle 12. The shackle 12 has a U-shaped design, however the skilled person is aware of different designs that are also suitable for the padlock body 10 disclosed herein.

Unless otherwise disclosed herein, the padlock body 10 comprises a second opening which is suitable for engaging with any standard locking cylinder 20. Said second opening is located on the opposite side (i.e., remote from) of the first opening and allows connecting the padlock body 10 to the replaceable locking cylinder 20, such as the connection between the actuator 30 and the replaceable locking cylinder 20 There are many known standard locking cylinders on the market, and the padlock body 10 is preferably arranged for engaging with a replaceable locking cylinder 20 having an oval profile.

The padlock body 10 further comprises an actuator 30 comprising a groove 32 at a first end and operatively connectable to a locking mechanism of the replaceable locking cylinder 20 at a second end, the second end being opposed to the first end. The second end of the actuator 30 may face the second opening of the padlock body 10, while the first end of the actuator 30 may face the opposite direction. The actuator 30 may be placed within a third opening of the padlock body 10, said third opening being arranged for allowing the groove 32 of the actuator 30 to receive the second end 14 of the shackle 12. The second end of the actuator 30 may be for instance rotatably and/or operatively connectable to the locking mechanism of the replaceable locking cylinder 20, such that a rotational force generated at the locking mechanism is transferred to the actuator 30, thus moving the actuator 30 between an unlocked and locked positions. Many locking mechanisms are known by the skilled person, which is aware of compatible locking mechanisms to the replaceable locking cylinder 20. Further, the actuator 30 has preferably a circular shape adapted for connecting with the locking mechanism at the second end, and has a groove 32 having a circular or oval shape that substantially matches the shape of the second end 14 of the shackle 12.

In a preferred embodiment, the second end of the actuator 30 is operatively connectable to a plug within the replaceable locking cylinder 20. Said plug and said second end of the actuator 30 may be operatively connected by a cam, such that a rotational force generated by an actuator device (for instance, a key inserted into a keyhole) to the plug is transferred to the actuator 30 by the rotation of the cam, thus moving the actuator 30 between an unlocked and locked positions.

The actuator 30 rotates about a vertical axis X between a locked position and an unlocked position, for instance about 90 degrees. In the unlocked position, the groove 32 of the actuator 30 is positioned such as to engage with the second end 14 of the shackle 12 when said second end 14 is moved to the groove 32. In the locked position, the actuator 30 is rotated about the axis X, thereby rotating the groove 32 of the actuator 30 and locking the second end 14 of the shackle 12 between the groove 32 and the body of the padlock body 10. The second end 14 of the shackle 12 (and thus the whole shackle 12) is not movable in any direction, such as a radial or axial direction. Consequently, the padlock body 10 secures an object placed between the shackle 12 and the padlock body 10.

The actuator 30 may be made of metal or an alloy, such as stainless steel or brass. Further, the groove 32 of the actuator 30 is only accessible to the second end 14 of the shackle 12 when said actuator 30 is in the unlocked position. The groove 32 may have a substantially circular or oval shape and tightly engages with the second end 14 of the shackle 12.

Figure 2A:
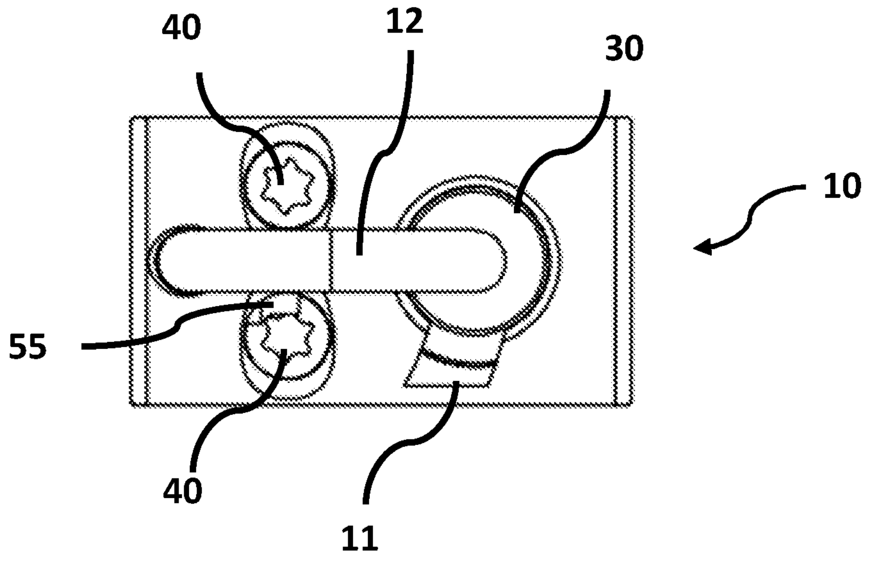
FIG. 2A illustrates an upper view of the padlock body in the locked position.

As illustrated on FIG. 2A, the padlock body 10 further comprises a fastener 40, such as two screws 40 fitted into two tapped holes. The at least one fastener 40 may comprise one or more tapped holes extending from the surface of the padlock body 10 receiving the shackle 12 and the actuator 30 to the direction of the replaceable cylinder 20 (or the second opening of the padlock body 10). Standard replaceable locking cylinders 20 typically have two tapped holes for inserting screws 40 and fastening the padlock body 10 to the replaceable locking cylinder 20. However, the skilled person is aware that one screw may be sufficient for fastening the padlock body 10 to the replaceable locking cylinder 20. The fasteners 40 may have a fastening direction parallel to the rotational axis X of the actuator 30, i.e., the fastening direction is from the padlock body 10 to the replaceable locking cylinder 20. When the fastener 40 is inserted into the tapped hole of the padlock body 10, said fastener 40 reaches a corresponding tapped hole of the replaceable locking cylinder 20, thus attaching the padlock body 10 to the replaceable locking cylinder 20.

Figure 2B:
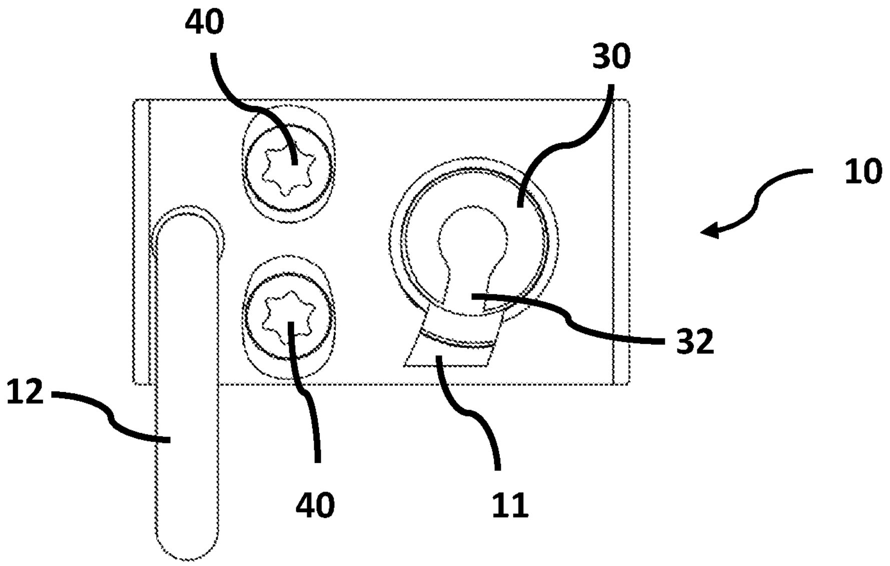
FIG. 2B illustrates an upper view of the padlock body in the unlocked position, according to an exemplary embodiment.

Additionally, one of the fasteners/screws 40 may be at least partially covered by a first blocking element 55, which physically blocks the removal of said fastener/screw 40 from the padlock body 10. Furthermore, said first blocking element 55 cannot be removed from the padlock body 10, when in the locked position, since access to the first blocking element 55 is hindered by the first end 13 of the shackle 12, which at least partly covers the first blocking element, as described elsewhere herein. On the other hand, in the unlocked position illustrated on FIG. 2B, the first blocking element 55 may be removed since the first end 13 of the shackle 12 no longer hinders access to the first blocking element 55, and therefore the fasteners/screws 40 become accessible from the top of the padlock body 10 (i.e., the surface of the padlock body 10 where the shackle 12 and the actuator 30 are located) and may be removed/screwed off using any compatible device, such as a screwdriver. Details about the functioning of the first blocking element 55 are disclosed elsewhere herein.

Furthermore, the padlock body 10 may comprise an indentation 11 aligned to the groove 32 of the actuator 30 when said actuator 30 is in the unlocked position. The indentation 11 guides and allows the second end 14 of the shackle 12 to reach the groove 32 of the actuator 30, before rotating the actuator 30 to the locked position. Said indentation 11 advantageously provide a padlock body 10 that may be locked merely by positioning the second end 14 of the shackle 12 into the groove 32 of the actuator 30 and rotating said actuator 30 to the locked position. Thus, no axial (e.g., upward/downward) movement of the shackle 12 in relation to the padlock body 10 is required for operating the device. In an alternative embodiment, the padlock body 10 may comprise two indentations 11, each of which positioned for guiding the second end 14 of the shackle 12 to the groove 32 of the actuator 30 whether the shackle 12 is rotated clockwise or counterclockwise.

Figure 3:
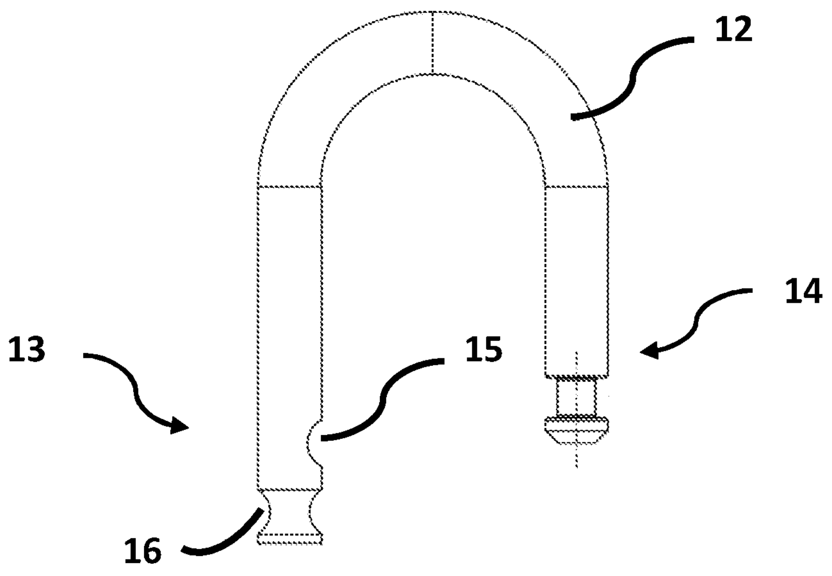
FIG. 3 illustrates a shackle isolated from the rest of the padlock body, according to an exemplary embodiment.

FIG. 3 illustrates a shackle 12 removed from the rest of the padlock body 10. The shackle 12 has a U shape, however other variations are known by the skilled person and may be used. The first end 13 of the shackle 12 may be longer than the second end 14, thus allowing rotatably attaching the first end 13 of the shackle 12 to the padlock body 10, while the second end 14 of the shackle 12 can rotate to the locked and unlocked positions. The first end 13 of the shackle 12 is located inside the padlock body 10 when the shackle 12 is connected to it and comprises a first recess 15. Said first recess 15 is located on part of the surface of the first end 13 of the shackle 12 and thus does not completely surround said surface. The first recess 15 comprises a smaller diameter when compared to a region of the first end 13 of the shackle 12 not comprising said first recess 15. Furthermore, the first recess 15 has preferably a circular or oval shape. The first recess 15 is positioned such that, in the unlocked position, said recess 15 aligns with the first lateral hole 50 in a same plane, for instance the same horizontal plane. The recess 15 radially encloses part of the first lateral hole 50. In other words, said part of the first lateral hole 50 is fitted in the first recess 15 in a position where both are aligned, and thus the first lateral hole 50 is unobstructed by the first end 13 of the shackle 12. In the locked position, (or when the second end 14 of the shackle 12 is moved towards the groove 32 of the actuator 30), said recess 15 is moved away and thus no longer aligns with the first lateral hole 50, which hinders placing or removing the first blocking element 55 from the first lateral hole 50 due to the presence of part of the first end 13 of the shackle 12.

The shackle 12 further comprises a second recess 16. The second recess 16 occurs about the whole surface of part of the first end 13 of the shackle 12, wherein said second recess 16 has a smaller diameter than the first end 13 of the shackle 12. The second recess 16 is positioned to align with a second lateral hole 60 of the padlock body 10, and therefore does not obstruct said second lateral hole 60, regardless of whether the device is in the locked position or in the unlocked position. When a second blocking element 65 is fitted into the second lateral hole 60, said second blocking element 65 is arranged within the second recess 16 of the shackle 12, thereby blocking an axial movement of the shackle 12.

Further, the second end 14 of the shackle 12 is adapted to interlock (i.e., tightly attach) with the groove 32 of the actuator 30. Said second end 14 of the shackle 12 may comprise a region having a smaller diameter when compared with the diameter of a non-engaging region of the shackle 12. Furthermore, the groove 32 may have a shape adapted to engage with the second end 14 of the shackle 12 having a smaller diameter such that at least part of the groove 32 is comprised in the region having a smaller diameter. Said region having a smaller diameter engages and interlocks with the groove 32 of the actuator 30, therefore locking the axial movement of the second end 14 of the shackle 12. When the actuator 30 is rotated to the locked position, the radial movement of the second end 14 of the shackle 12 is also obstructed.

Figure 4A:
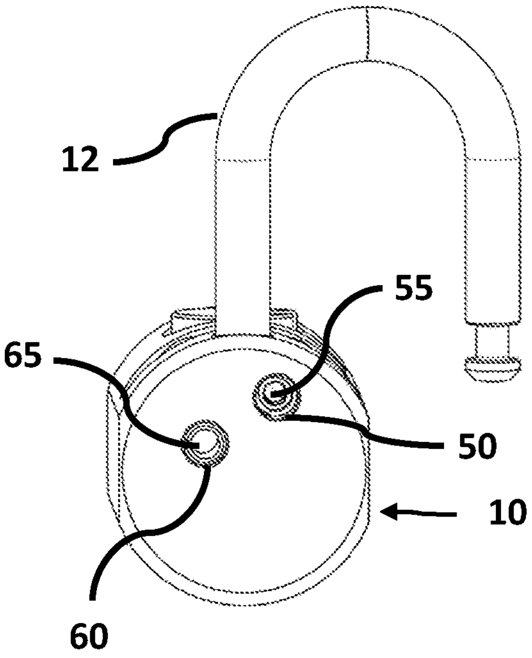
FIG. 4A illustrates a lateral view of the padlock body in the unlocked position.

As illustrated by FIG. 4A, a lateral side of the padlock body 10 which is closer to the first end 13 of the shackle 12 comprises a first lateral hole 50 for receiving a first blocking element 55. Said first blocking element 55 may be a screw or a bolt. The first lateral hole 50 is substantially perpendicular to the fastening direction of the fastener 40. Further, said first lateral hole 50 extends through the padlock body 10 and intersects with the fastener 40. Additionally, the first end 13 of the shackle 12 comprises a first recess 15 (not visible), which radially encloses part of the first lateral hole 50 when the shackle 12 is disengaged with the groove 32 of the actuator 30. The first recess 15 at the first end 13 of the shackle 12 is substantially circular and abuts with the first lateral hole 50, such that the first recess 15 and the first lateral hole 50 are aligned in a same plane (for instance, the same horizontal plane), in the unlocked position. In other words, the first recess 15 is adapted to align with the first lateral hole 50 only in the unlocked position, thereby exposing the first blocking element 55 inserted into the first lateral hole 50. Thus, the first blocking element 55 is at sight and may be removed from or inserted to the first lateral hole 50 of the padlock body 10 by using for instance a screwdriver.

Figure 4B:
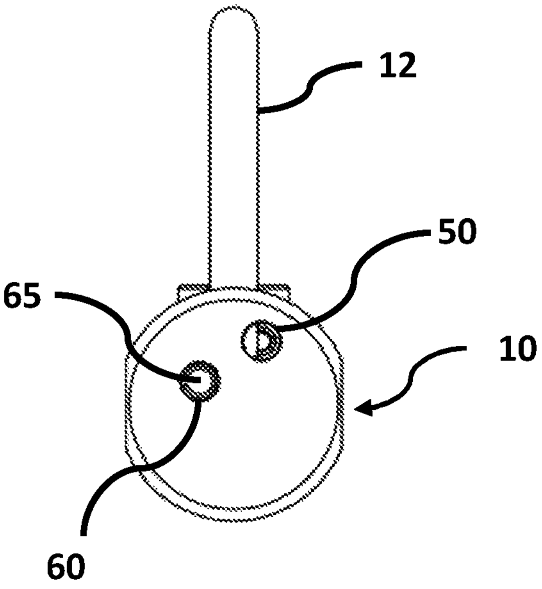
FIG. 4B illustrates a lateral view of the padlock body in the locked position, according to an exemplary embodiment.

As seen in FIG. 4B, when the shackle 12 is pivoted to the actuator 30 in the locked position, the first recess 15 is also pivoted away from the first lateral hole 50. Then, the first end 13 of the shackle 12 at least partly obstructs the first lateral hole 50 and the first blocking element 55 therein becomes inaccessible for removal from the outside.

Furthermore, when fully screwed into the first lateral hole 50, the first blocking element 55 is arranged upon the fastener 40 (e.g., the screw), thereby blocking access to the fastener 40 from the outside and hindering removal of the fastener 40 while in the locked position (visible on FIG. 2A).

As also illustrated by FIGS. 4A and 4B, a side of the padlock body 10 which is closer to the first end 13 of the shackle 12 further comprises a second lateral hole 60 for receiving a second blocking element 65. Said second blocking element 65 may be a pin or a rod. The second lateral hole 60 extends through the padlock body 10 and is substantially perpendicular to the fastening direction of the fastener 40. Further, the first end 13 of the shackle 12 comprises a second recess 16 which radially encloses part of the second lateral hole 60, regardless of whether in the unlocked or locked position. The second recess 16 at the first end 13 of the shackle 12 is substantially circular and abuts with the second lateral hole 60, such that the second recess 16 and the second lateral hole 60 are aligned in a same horizontal plane, in both locked and unlocked positions. Further, the second blocking element 65 inserted into the second lateral hole 60 is positioned within the recess 16, and thus attaches the second end 13 of the shackle 12 to the padlock body 10 and hinders an axial movement of the second end 13 of the shackle 12 in relation to the padlock body 10. The second blocking element 65 may be any element that is tightly fixed into the second lateral hole 60, such as a pin or a rod. The second blocking element 65 may be arranged to further avoid removal, for instance being glued or welded to the second lateral hole 60.

Figure 5:
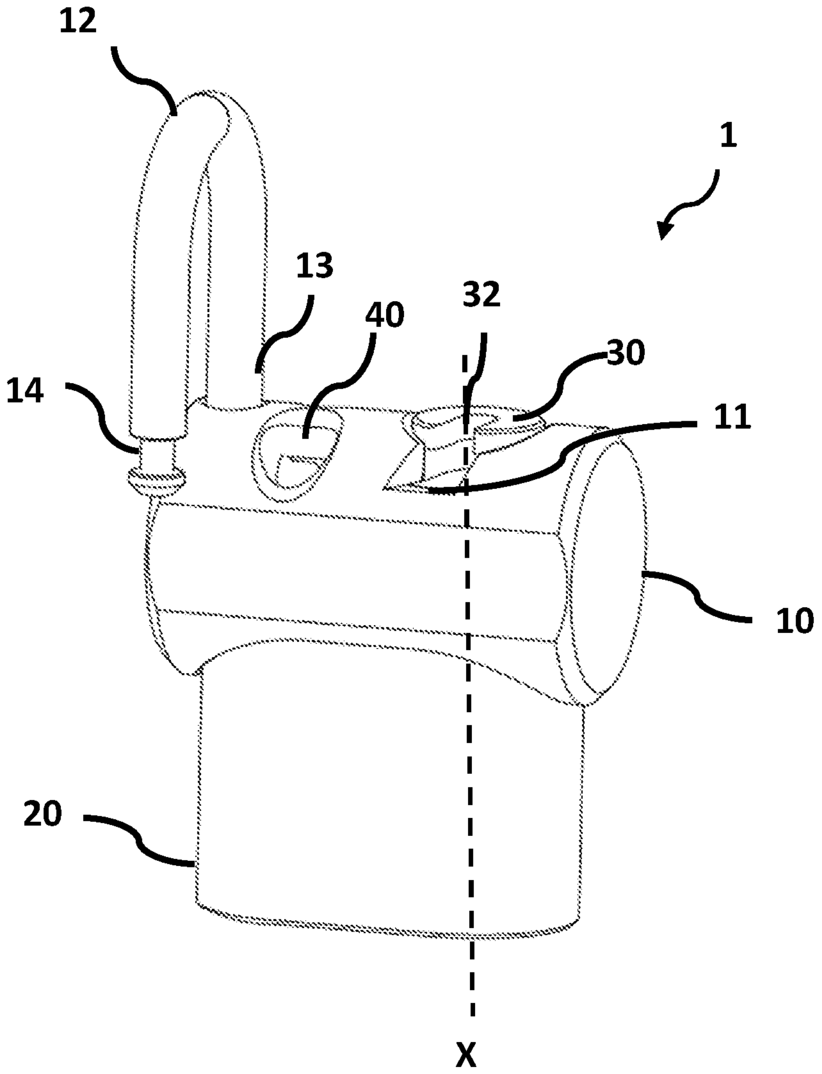
FIG. 5 illustrates the padlock comprising a padlock body and a replaceable locking cylinder, according to an exemplary embodiment.

As illustrated by FIG. 5, the padlock 1 comprises a padlock body 10 as disclosed elsewhere herein, and a replaceable locking cylinder 20. As previously discussed, the padlock body 10 and the replaceable locking cylinder 20 are engaged by fasteners 40, such as screws. Furthermore, the replaceable locking cylinder 20 may comprise all necessary elements that constitutes a working padlock 1. For instance, the replaceable locking cylinder 20 may comprise a plug, an opening for inserting an actuator device such as a key (not shown) and a cam for transferring the rotational movement of the plug to the actuator 30.

The skilled person is aware of locking mechanisms suitable for the replaceable locking cylinder 20. The locking mechanisms is preferably aligned with the actuator 30 in the same axis X when the replaceable locking cylinder 20 is attached to the padlock body 10. In general terms, a correct key is inserted into a keyhole and rotated about 90 degrees. The rotation of the key also rotates the plug and the cam at the end of the plug, which is in operatively contact with the actuator 30. The rotation of the cam operatively connected to the actuator 30 promotes the rotation of the actuator 30 between a locked and an unlocked position. When the second end 14 of the shackle 12 is engaged with the groove 32 of the actuator 30, the rotation of the actuator 30 to the locked position hinders any axial and/or radial movement of the second end 14 of the shackle 12, thus locking an object located between the shackle 12 and the padlock 1. When the key is removed from the keyhole, the locking mechanism of the replaceable locking cylinder 20 hinders any movement of the actuator 30.

The padlock body 10, the replaceable locking cylinder 20 and/or the padlock 1 may be made of metal or an alloy, such as stainless steel or brass.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Unless expressly described to the contrary, each of the preferred features described herein can be used in combination with any and all of the other herein described preferred features.

The invention claimed is:

1. A padlock body (10) engaged with a replaceable locking cylinder (20) and comprising:

an actuator (30) comprising a groove (32), the actuator (30) being rotatable about a vertical axis (X) between a locked position and an unlocked position, the actuator (30) further comprising a first end and a second end opposed to the first end, the first end comprising the groove (32) and the second end being operatively connectable to the replaceable locking cylinder (20);

a shackle (12) comprising a first end (13) and a second end (14), the first end (13) being attached to said padlock body (10), the second end (14) being movable for engaging with the groove (32) of the actuator (30); and at least one fastener (40) for securing the padlock body (10) to the replaceable locking cylinder (20), wherein:

in the unlocked position, the actuator (30) is rotated about the vertical axis (X) such that the groove (32) of the actuator (30) is positioned for engaging with the second end (14) of the shackle (12);

in the locked position, the actuator (30) is rotated about the vertical axis (X) such that, when the second end (14) of the shackle (12) is engaged with the groove (32) of the actuator (30), the second end (14) of the shackle (12) is restrained within the groove (32) of the actuator (30);

the padlock body (10) further comprises a first blocking element (55) and a first lateral hole (50) for receiving the first blocking element (55), the first lateral hole (50) intersecting a fastening direction of the fastener (40), such that removal of the fastener (40) is hindered by the first blocking element (55);

the first end (13) of the shackle (12) further comprises a first recess (15), the first recess (15) radially enclosing part of the first lateral hole (50) when the second end (14) of the shackle (12) is disengaged with the groove (32) of the actuator (30);

in the unlocked position, the first recess (15) and the first lateral hole (50) are aligned in a same plane, thereby exposing the first blocking element (55) inserted therein; and in the locked position, the first recess (15) is moved away from the radially enclosing position, such that the first end (13) of the shackle (12) hinders access to the first blocking element (55) inserted therein.

2. The padlock body (10) according to claim 1, further comprising an indentation (11), said indentation (11) being aligned with the groove (32) of the actuator (30) in the unlocked position.

3. The padlock body (10) according to claim 2, wherein the first end (13) of the shackle (12) rotates about a vertical axis which is parallel to the vertical axis (X) of the actuator (30).

4. The padlock body (10) according to claim 1, wherein the first end (13) of the shackle (12) rotates about a vertical axis which is parallel to the vertical axis (X) of the actuator (30).

5. The padlock body (10) according to claim 1, wherein the second end (14) of the shackle (12) comprises a depression adapted to interlock with the groove (32) of the actuator (30).

6. The padlock body (10) according to claim 1, wherein the actuator (30) rotates about 90 degrees between the unlocked position and the locked position.

7. The padlock body (10) according to claim 1, wherein the fastener (40) comprises at least one screw or bolt, each of the at least one screw or bolt being releasably fixed into a hole extending through part of the padlock body (10) and part of the replaceable locking cylinder (20).

8. The padlock body (10) according to claim 1, wherein the first blocking element (55) is a screw or a bolt.

9. The padlock body (10) according to claim 1, wherein:

the padlock body (10) further comprises a second blocking element (65) and a second lateral hole (60) for receiving the second blocking element (65), the second lateral hole (60) being substantially perpendicular to a fastening direction of the fastener (40);

the first end (13) of the shackle (12) further comprises a second recess (16); and the second recess (16) radially enclosing part of the second lateral hole (60), such that the second blocking element (65) inserted into the second lateral hole (60) engages with the second recess (16), thereby fixing the first end (13) of the shackle (12) to the padlock body (10) and hindering axial movements of the first end (13) of the shackle (12).

10. The padlock body (10) according to claim 9, wherein the second blocking element (65) is a pin or a rod.

11. The padlock body (10) according to claim 1, wherein the padlock body (10) is adapted for engaging with an oval replaceable locking cylinder (20).

12. A padlock (1) comprising:

the padlock body (10) of claim 1; and a replaceable locking cylinder (20).

13. The padlock (1) according to claim 12, wherein the replaceable locking cylinder (20) is an oval replaceable locking cylinder (20).

14. A method of replacing a replaceable locking cylinder (20) from a padlock (1), the method comprising the steps of:

providing a padlock (1) having a padlock body (10) and a replaceable locking cylinder (20), the padlock body (10) comprising: an actuator (30) comprising a groove (32), the actuator (30) being rotatable about a vertical axis (X) between a locked position and an unlocked position; the actuator (30) further comprising a first end and a second end opposed to the first end, the first end comprising the groove (32) and the second end being operatively connectable to the replaceable locking cylinder (20); a shackle (12) comprising a first end (13) and a second end (14), the first end (13) being attached to said padlock body (10), the second end (14) being movable for engaging with the groove (32) of the actuator (30); at least one fastener (40) securing the padlock body (10) to the replaceable locking cylinder (20); and a first blocking element (55) and a first lateral hole (50) for receiving the first blocking element (55), the first lateral hole (50) intersecting a fastening direction of the fastener (40), such that removal of the fastener (40) is hindered by the first blocking element (55), wherein the first end (13) of the shackle (12) further comprises a first recess (15), the first recess (15) radially enclosing part of the first lateral hole (50) when the second end (14) of the shackle (12) is disengaged with the groove (32) of the actuator (30);

positioning the padlock (1) into an unlocked position, whereby the first recess (15) and the first lateral hole (50) are aligned in a same plane, thereby exposing the first blocking element (55) inserted therein;

removing the first blocking element (55) from the first lateral hole (50), thereby exposing the at least one fastener (40);

removing the at least one fastener (40) attaching the padlock body (10) to the replaceable locking cylinder (20); and replacing the replaceable locking cylinder (20).

* * * * *